(12) United States Patent
Carper et al.

(10) Patent No.: US 8,122,748 B2
(45) Date of Patent: Feb. 28, 2012

(54) HOSE FITTING

(75) Inventors: Jeffrey W. Carper, Tiffin, OH (US); Thomas E. Hay, Tiffin, OH (US)

(73) Assignee: National Machinery LLC, Tiffin, OH (US)

( * ) Notice: Subject to any disclaimer, the term of this patent is extended or adjusted under 35 U.S.C. 154(b) by 828 days.

(21) Appl. No.: 12/055,565

(22) Filed: Mar. 26, 2008

(65) Prior Publication Data

US 2009/0241631 A1    Oct. 1, 2009

(51) Int. Cl.
*B21D 22/00*    (2006.01)
(52) U.S. Cl. ............................................ 72/356; 72/256
(58) Field of Classification Search .................. 285/190, 285/191; 72/256, 356
See application file for complete search history.

(56) References Cited

U.S. PATENT DOCUMENTS

| 4,854,030 | A | * | 8/1989 | Nishikawa et al. ............. 29/510 |
| 5,657,663 | A | | 8/1997 | Miyahara et al. |
| 6,044,543 | A | | 4/2000 | Dorth et al. |
| 2006/0288754 | A1 | * | 12/2006 | Otaki .............................. 72/325 |

FOREIGN PATENT DOCUMENTS

| EP | 0623408 A1 | 11/1994 |
| EP | 0766015 A1 | 4/1997 |
| EP | 1352695 A1 | 10/2003 |

OTHER PUBLICATIONS

European Search Report dated Jul. 2, 2009 of corresponding Application No. EP 09250858.9, filed Mar. 26, 2009.

* cited by examiner

*Primary Examiner* — Dana Ross
*Assistant Examiner* — Matthew G Katcoff
(74) *Attorney, Agent, or Firm* — Pearne & Gordon LLP

(57) ABSTRACT

A machine, tooling and method for cold forming complex metal parts such as a banjo style hose fitting starting with a near net shape volume of wire and continuing with multiple forging blows and an intermediate rotation of the blank to produce a hose coupling shell end, a transition neck, a large counterbored annular coupling body and a perpendicular alignment tang.

4 Claims, 8 Drawing Sheets

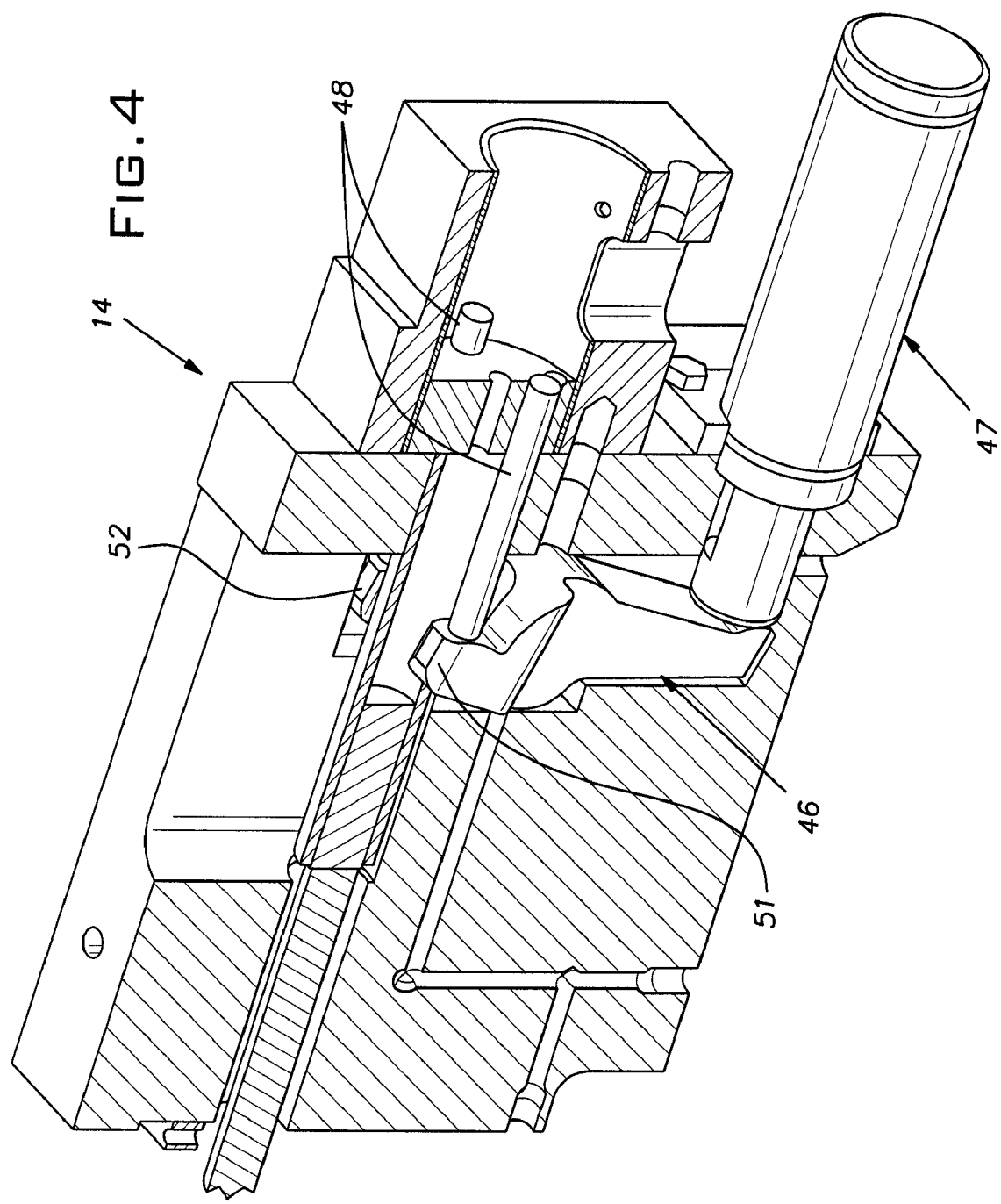

HOSE FITTING

The invention relates to cold-forming complex metal parts and, in particular, seamless hollow parts having features developed on different axes.

BACKGROUND OF THE INVENTION

Multi-station or progressive cold-forging machines are well known. Up to now, as far as known, the versatility of such machines has been limited, inter alia, by the number of stations available in a given machine. When a part can be cold-formed from a metal blank that is at or near the volume of the finished part, sometimes referred to as net shape or near net shape, considerable savings in material cost, machine time, and labor can be realized. There thus exists a need for machines of the nature described with improved versatility and for new methodology to advance the art of cold forming complex metal parts.

SUMMARY OF THE INVENTION

The invention provides a methodology of operating a progressive forming machine that produces a part with multiple features formed on multiple axes perpendicular to one another. The invention affords, as another aspect of the invention, a novel hose fitting that includes a counterbored connector body and an integral alignment tang. In the forming process of the invention the tang is caused to extend well beyond the plane of a mounting face of the connector body to thereby securely and reliably locate and orient the fitting on a brake caliper or like housing or manifold. The inventive method produces the brake hose fitting in a condition that is ready for assembly with the hose without secondary machining operations except for drilling of a small fluid passage.

BRIEF DESCRIPTION OF THE DRAWINGS

FIG. 4 is a somewhat diagrammatic fragmentary perspective view of a high force lever and gas spring system for biasing the dies at selected forming stations.

DESCRIPTION OF THE PREFERRED EMBODIMENT

Figure 1:
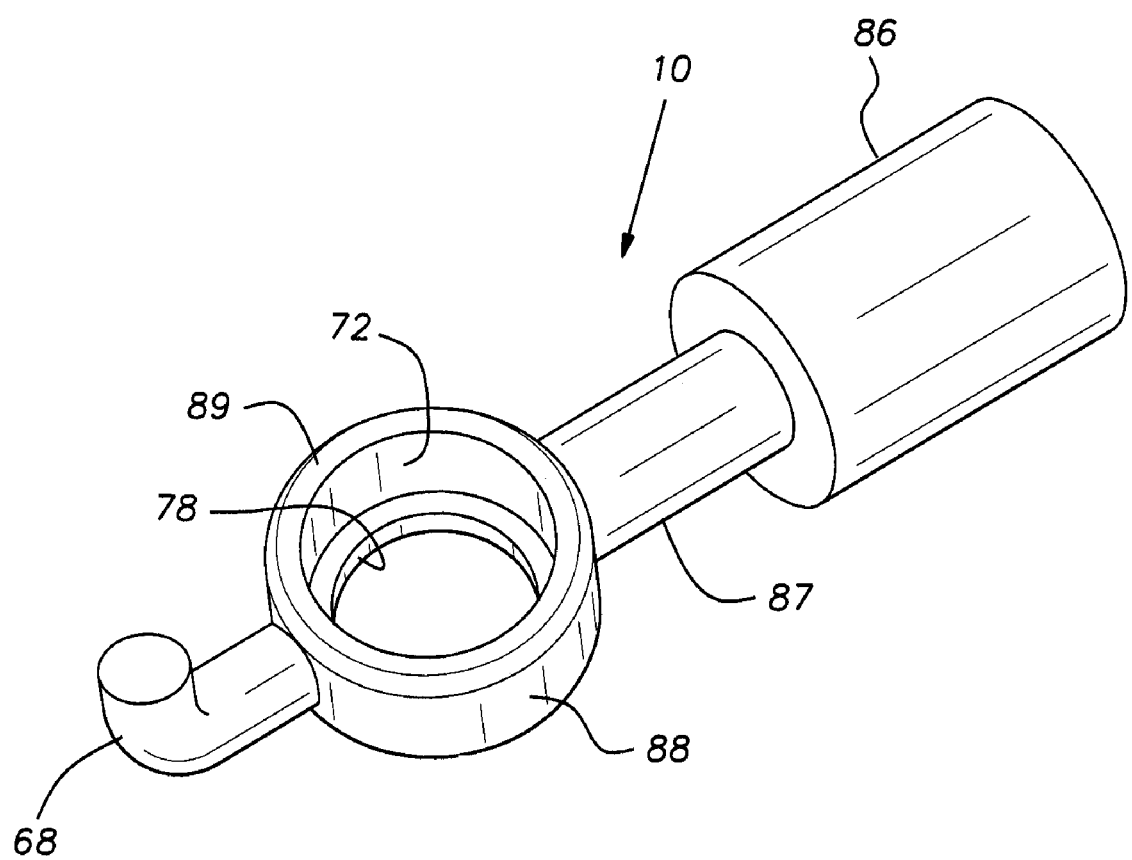
FIG. 1 is a perspective view of a banjo style brake hose fitting made by the process of the invention.

FIG. 1 illustrates a cold-formed metal part 10, typically made of steel, in the form of a brake hose fitting. The particular form of fitting 10 is of the banjo style, a description derived from its similar appearance to the musical instrument. The part 10 is preferably formed of a suitable steel such as spheroidalized annealed steel. A description of the process, machine, and tooling used to make the part 10 follows.

In FIGS. 2A, 2B and 3A, 3B, and 3C, the preforms of the part 10 are identified by the numeral 10 with a sequential letter of the alphabet as a suffix corresponding to its stage in the progressive forming steps.

Figure 2A:
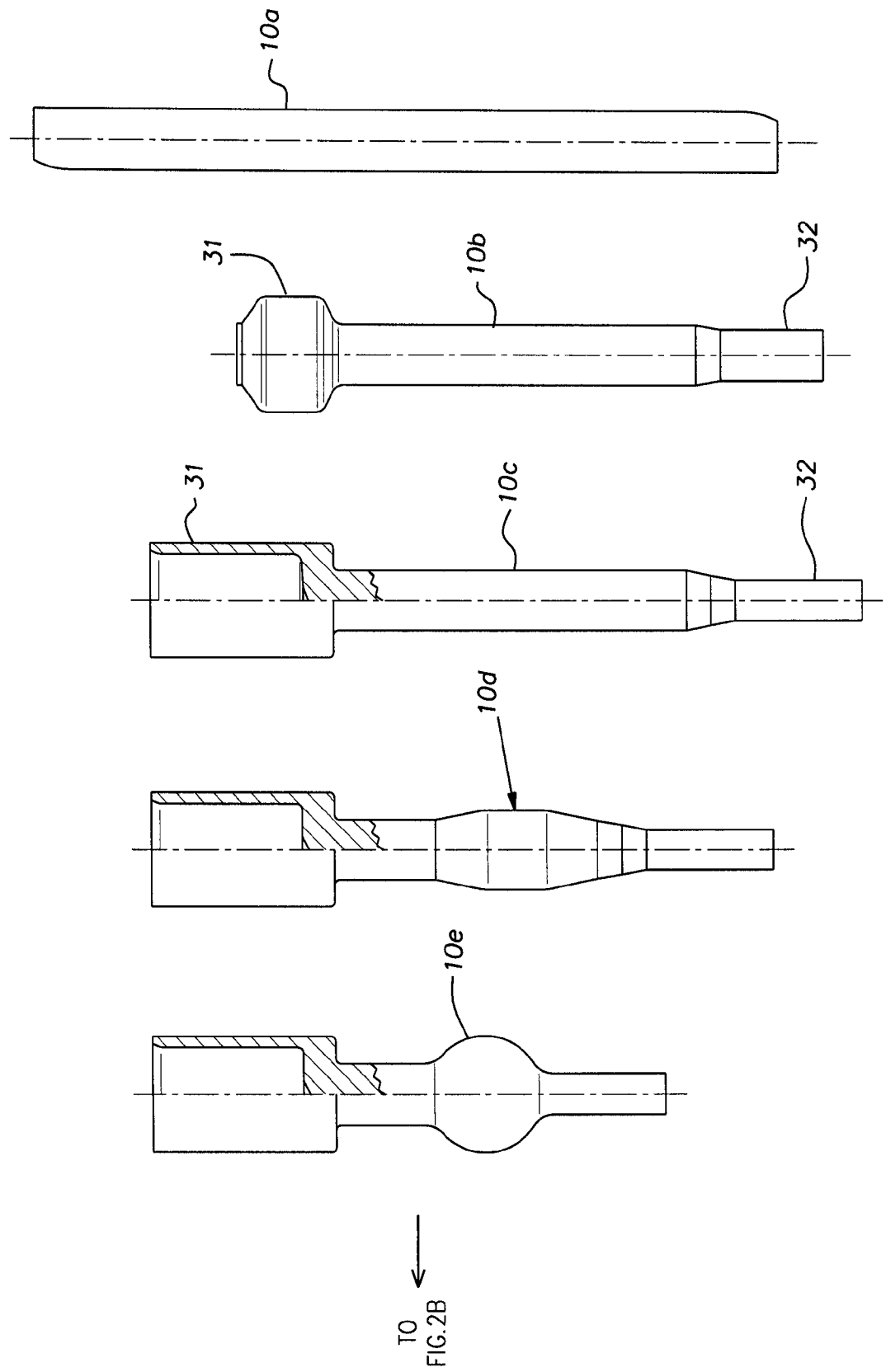
FIGS. 2A and 2B show the brake hose fitting in successive stages of cold forming.
Figure 2B:
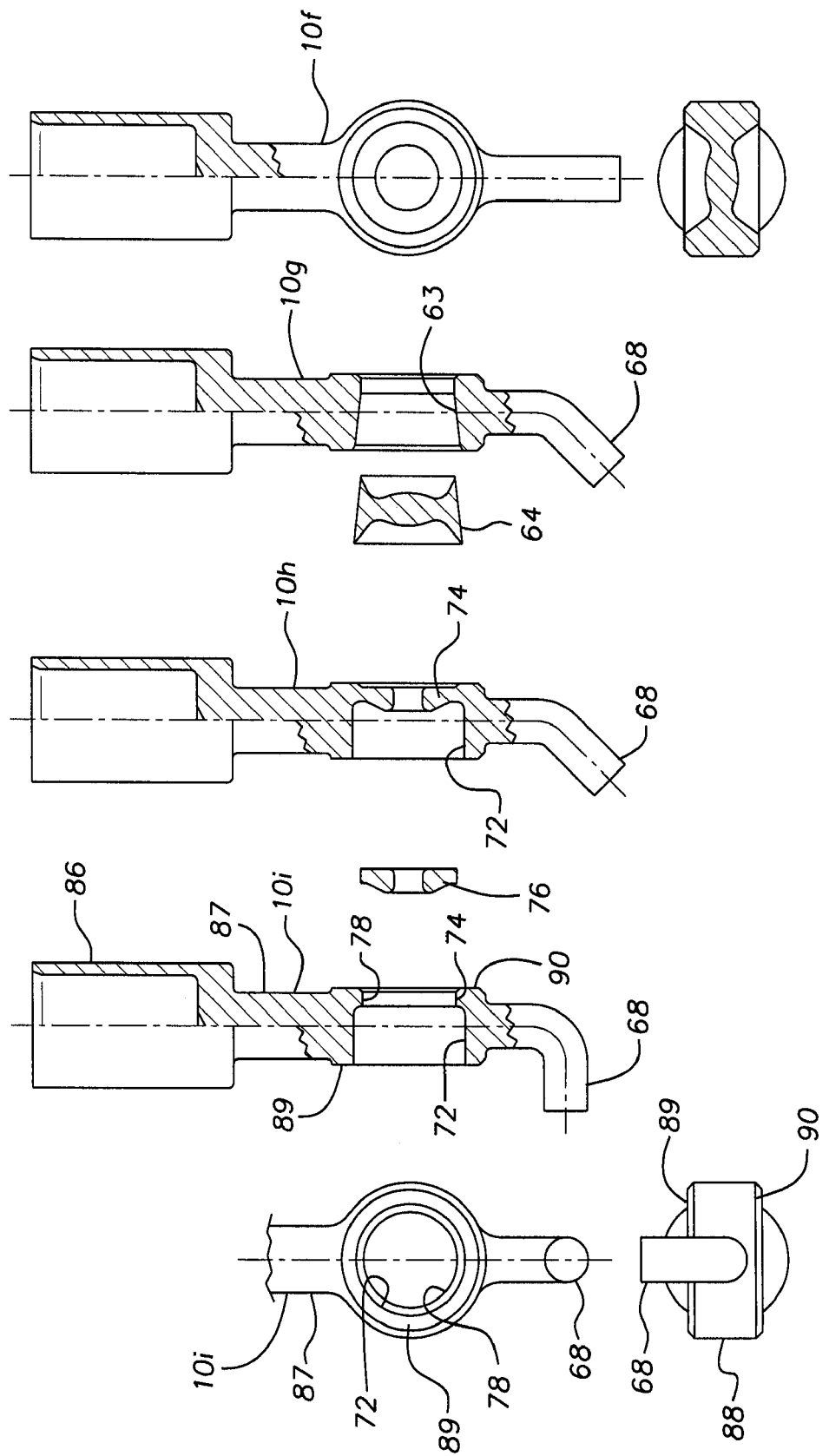
Figure 3A:
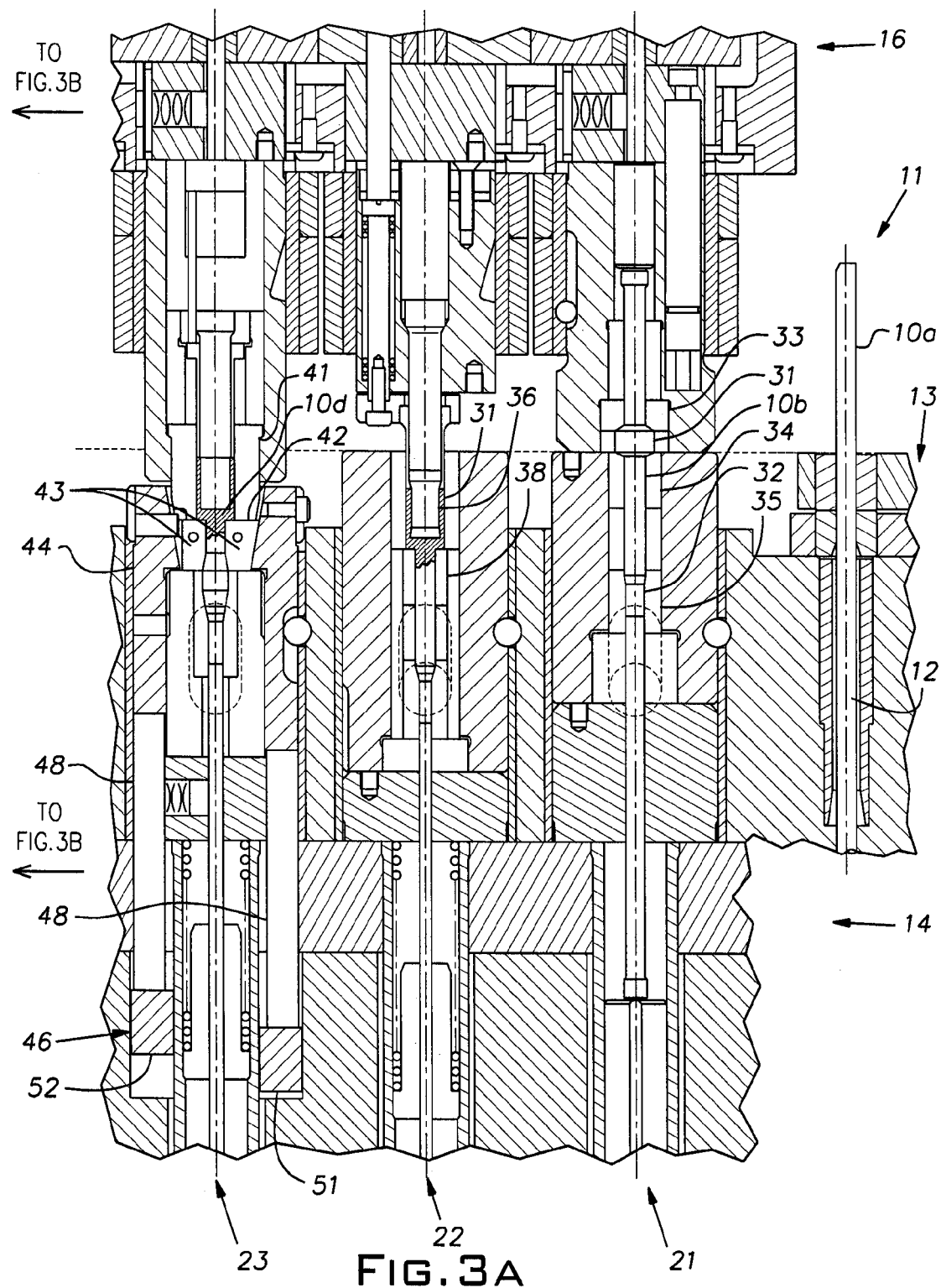
FIGS. 3A, 3B and 3C show progressive forming steps in the environment of a multi-station forging machine used to produce the brake hose fitting.
Figure 3B:
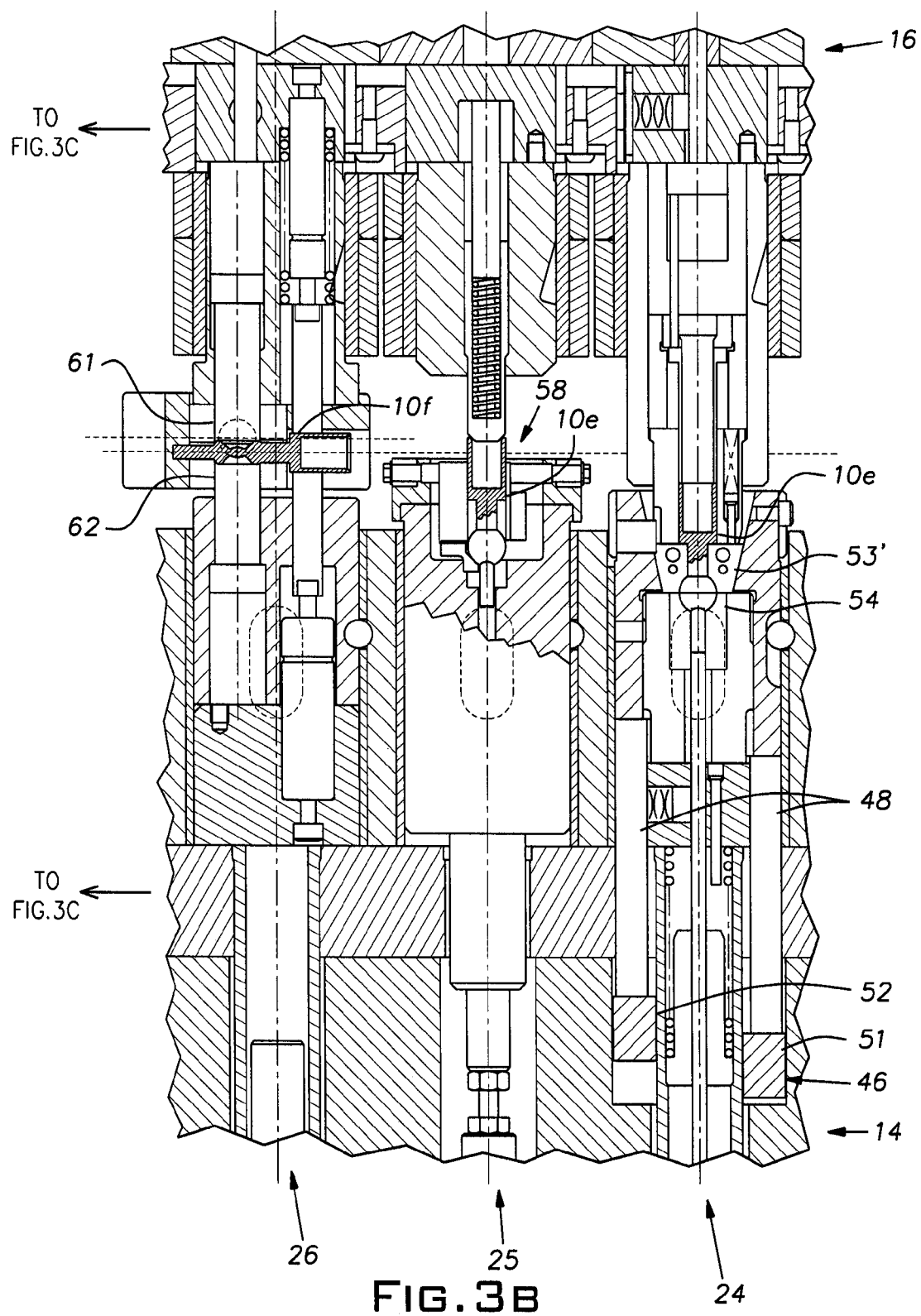
Figure 3C:
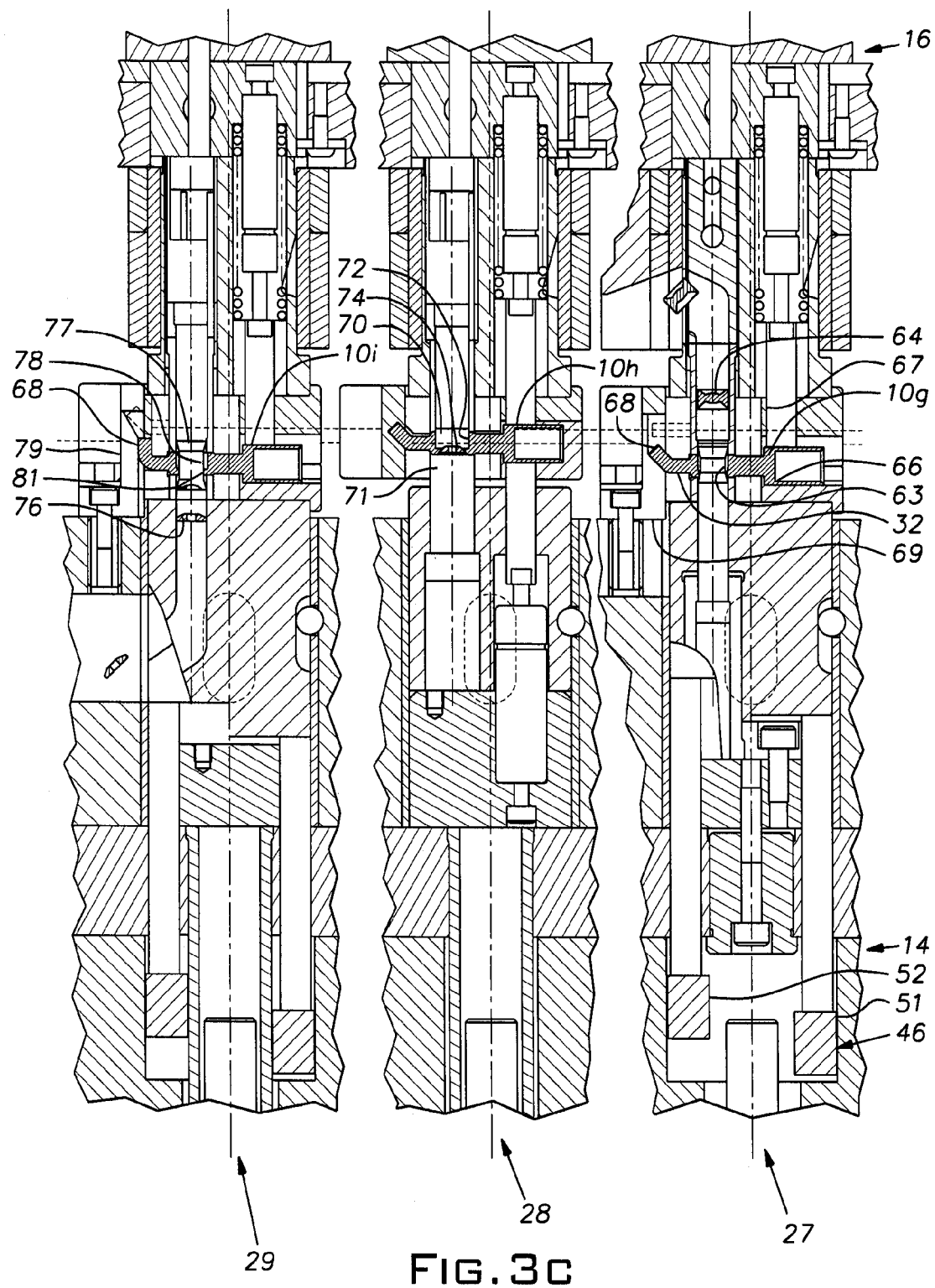

In the following description, an intermediate part may be designated just by the numeral 10 such as when the part is in a transitional period between forming stages. FIGS. 2A and 2B provide partial sectional views of the part preform while FIGS. 3A, 3B, and 3C provide views of the part preforms within successive stations of a progressive cold-forming or forging machine 11. The machine 11 is of generally conventional construction except that it has an increased number of forming stations. In the illustrated case, the number of forming stations is nine, although in the disclosed process, one of the stations is dedicated to manipulating the part as opposed to contributing a forming step at such station. This explains why the number of stages shown in FIGS. 2A and 2B is different than the number of stations seen in FIGS. 3A, 3B, and 3C.

Wire stock 12 (FIG. 3A) typically fed from a supply coil is cut to a precise length at a cutoff station 13 to provide a starting piece 10a for the part 10. From this cutoff station 13, the part 10 is sequentially moved to subsequent stations, where it is progressively formed or, in one case, rotated, by a mechanical transfer (not shown) of generally conventional design. A die breast or block is indicated at 14 and a reciprocating slide or ram is indicated at 16.

The forming stations of the machine 11 are identified by the numerals 21-29 inclusive. In the first forming station 21, the part 10b is coned or upset at one end 31 to locally increase its diameter and open extruded at the other end 32 to decrease its diameter by tools 33, 34, and 35 on the slide 16 and die block 14, respectively. The part 10 is transferred to the second forming station 22 where, in the next blow of the slide 16, it is back extruded at the end 31 by a tool 36 on the slide 16 to create a cylindrical shell and further open extruded at the other end 32 with a tool 38 carried on the die block 14 to create a further reduction in diameter.

In the third forming station 23, the part 10d is double upset or coned at its mid-length by tools 41, 42. The tool 42, carried on the die block 14, comprises segmented inserts 43. These segmented inserts 43 are arcuate segments that contract radially inwardly against the part 10 when the punch tool 41 first strikes the end face of the segments 43. The segments 43 work in a tapered bore of a die case 44. The die case 44 is strongly biased to a forward position towards the slide 16 by a forked lever 46 that, in turn, is pushed by a large high pressure nitrogen gas spring 47 (FIG. 4). In the disclosed arrangement, upper ends of the forked lever 46 operate on the die case 44 through push rods 48. The segment inserts 43 establish the position and geometry of the upset at the mid-length of the part 10d. The spring biased lever 46 allows the die case 44 to yield axially rearwardly to the force of the slide 16 during the actual upset action at the forward end of the slide stroke while maintaining the segments closed around the part 10d to properly shape it. When the slide 16 retracts, the segment inserts 43 open to allow release of the upset mid-section and subsequent transfer of the part from this station 23.

In FIGS. 3A, 3B, and 3C tines 51, 52 of the forked lever 46 are offset from one another, the one on the right being retracted and the one on the left being extended. This offset between the tines 51, 52 is for illustrative purposes only in these figures to simply show the typical movement of the lever and it will be understood that the tines in actuality are working in concert and are at the same relative position to the die plate or block 14.

The part 10 is advanced to the fourth station 24 where its mid-section is again double upset in tooling 53, 54 in a die case to develop a spherical or ball-shaped mid-section. The die side tooling 53 comprises segmented inserts operated like that just described in connection with the tooling inserts 43 at the previous station 23. As before, a gas spring powered lever 46 biases a die case 56 through push rods 48.

Figure 5:
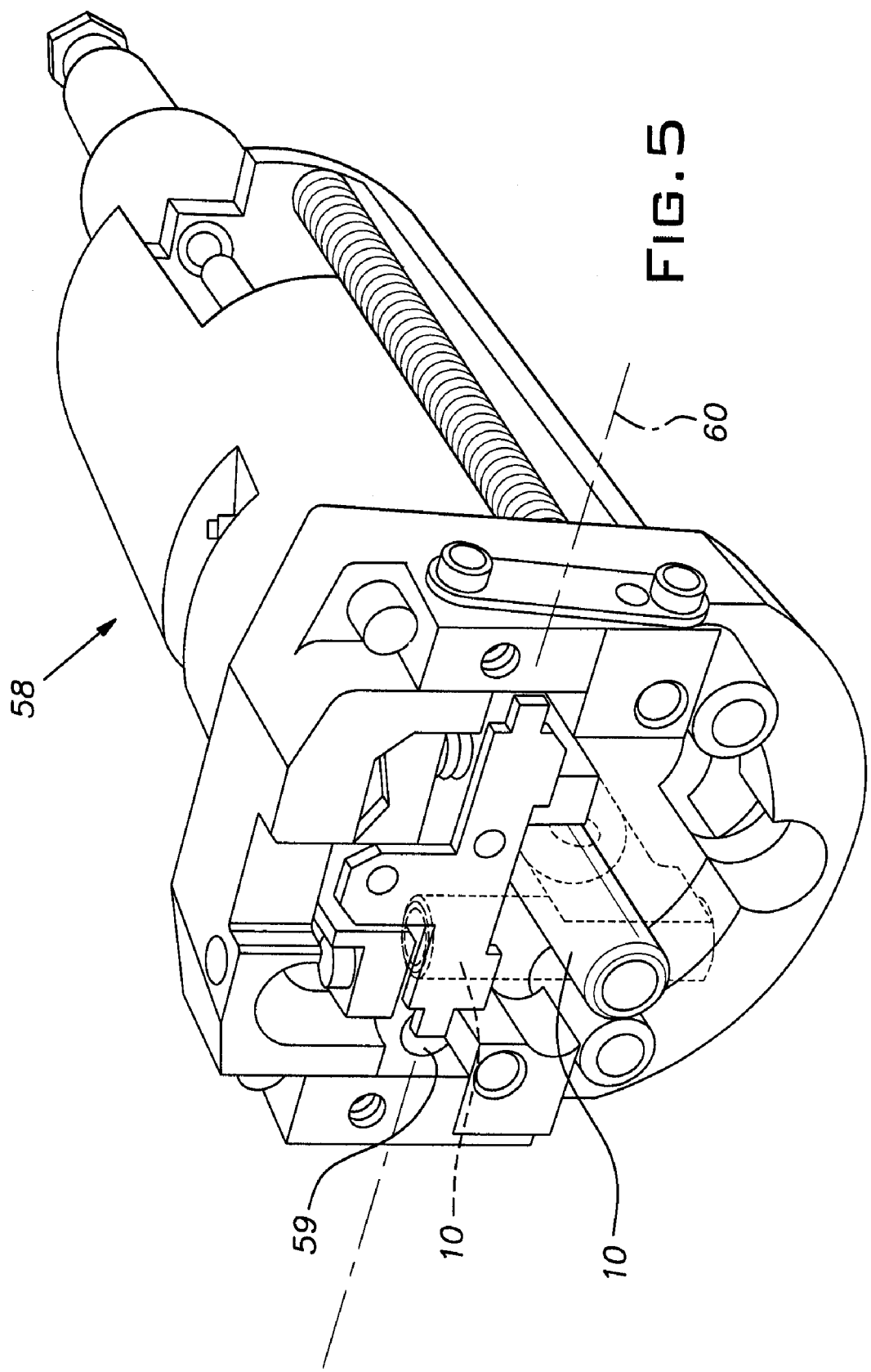
FIG. 5 is a schematic drawing of a part rotator.

Next, the part 10 is transferred to the fifth station 25 where it is received in a blank rotator 58. The blank rotator 58 occupies the space normally taken up by a regular die case at this station 25. The blank rotator 58 is schematically shown in FIG. 5 in a perspective view. No forming of the part 10 occurs in this station 58 when the slide 16 comes forward in the next stroke. When the slide retracts, the part rotator 58 rotates the part 10 90° from its original orientation where its longitudinal axis is horizontal and parallel to slide motion to an orientation where its longitudinal axis is vertical with the hollow or shell end 31 up and the pin or tang end 32 down. The rotation of the part 10 is about a horizontal axis 60 of a trunnion-like structure 59. This rotation is synchronized with the die kick-out motion at the station 25.

In its progress from this station 25 through subsequent stations 26-29 inclusive, the part 10 remains in the orientation with longitudinal axis in an upright or vertical position, i.e. perpendicular to the motion of the slide 16 and to the plane of the work stations 21-29. However, for purposes of illustrating the process in a clear, simplified single drawing, the part 10 in FIGS. 3B and 3C is shown in the stations 26-29 beyond the rotator station 25 in what appears to be a horizontal orientation. It should be understood, therefore, in actuality, the part 10 is vertical in the stations with the shell end 31 up. Of course, the tooling is oriented so that it compliments the respective progressive shapes produced at each of the respective stations.

In the sixth forming station, the spherical mid-section of the part 10f is flattened and dimpled or recessed by tooling 61, 62 on the punch and die sides, respectively.

At the seventh station 27, the flattened mid-section of the part 10g is pierced to form a circular bore 63 by removing a round slug or coupon 64 and a pin or tang 68 comprising the part end 32 is bent laterally off the longitudinal axis of the part. A gas spring 47 and forked lever 46 like that described in connection with the third station 23, is used to hold the die tooling 66 against the punch tooling 67 during the forming of the part 10g at this station. The bending action on the tang designated 68 is produced by an anvil-like tool 69 rigidly fixed to the die plate. The tooling and timing of the actuation of the tooling is such that the piercing of the bore 63 occurs before the tang 68 is bent. This isolates the forces of these different operations from each other so as to achieve consistent forming action in both the formation of the bore 63 and the bending action on the tank 68.

The part 10h in the eighth station 28, backed up by tooling 71 on the die side, has its bore broached or sheared by punch tooling 70 to gather material from the wall area forming the previous bore 63 at one end of this bore and in effect forming a counterbore 72 with an end wall 74.

At the last or ninth station 29, the pin or tang 68 is bent on an anvil tool 79 fixed on the die plate 14 so that the tang 68 extends perpendicularly to the longitudinal axis of the part 10i. Ideally, the tang 68 extends laterally outward of the plane of the adjacent side of the circular body surrounding the bore 72 so that it can reliably be received in a hole, slot or other formation to align the fitting 10 to the body of a brake caliper or cylinder. Also at this station, after bending the tang 68, the part 10i is re-pierced through the counterbore end wall formed in the preceding station to complete the finish shape of the counterbore by cutting an annular slug or coupon 76 from the part with punch tooling 77 to make a precise hole or bore 78 at the end wall 74. Like the tooling action that occurred in the seventh station, tools 81 on the die plate or block 14 are forwardly biased by a gas spring 47 operating through a forked lever 46 as previously described. The biasing force assures that the punch and die tools, 77, 81 work like complementary clamshell halves to precisely hold the part 10i during these forming operations.

The part 10 is finished as far as cold-forming is concerned at the last station 29i. As seen in FIG. 2 in the last stage, as well as in FIG. 1, a part 10 produced by the disclosed methodology is of complex shape. The part 10, a banjo style brake hose fitting, includes a hollow cylindrical shell 86, a cylindrical solid neck area 87, a circular body 88 having a large counterbore 72 on an axis perpendicular to the shell and neck and being open at two opposite faces 89, 90, and a round tang 68 extending from the longitudinal axis at a right angle for distance sufficient to project beyond the plane of a face 89 of the circular body or ring 88. A central hole (not shown) is drilled through the neck 87 to provide fluid communication from a hose end assembled in the shell 86 and the counterbore 72. The shell 86 may be crimped over the hose end in a customary manner to lock it in position and form a fluid tight seal therewith. A bolt, not shown, is assembled into the counterbore 72 from the side of the face 90 and threaded into the body to which the fitting couples the hose.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method of forming a product having a general shape of a banjo style hose fitting comprising the steps of cutting a piece of round metal wire, with a central axis, to a length corresponding to a volume near net shape of the finished part, coning one end of the initial part to increase its diameter, upsetting a portion of the part spaced from the coned end into a ball-like formation, back extruding the coned end to form a hollow open end shell concentric with the axis for receiving a cylindrical part, flattening the ball-like formation to form opposed faces and piercing a hole through the flattened formation from one of its faces.

2. A method as set forth in claim 1, wherein the part is open extruded on an end opposite said coned end to form an alignment tang.

3. A method as set forth in claim 2, wherein said alignment tang is bent at a right angle to its original axis of extrusion.

4. A method as set forth in claim 1, wherein said flattened formation is formed with a counterbore produced by piercing said formation twice, the first piercing step producing a temporary bore, the temporary bore being sheared into a larger bore to gather material adjacent the other of said faces and the second piercing step forming the minor bore of said counterbore.

* * * * *